(12) United States Patent
Mukai et al.

(10) Patent No.: US 6,972,536 B2
(45) Date of Patent: Dec. 6, 2005

(54) CLOSURE MEMBER CONTROL DEVICE AND METHOD FOR LIMITING POSITIONAL DEVIATION OF CLOSURE MEMBER

(75) Inventors: Daisuke Mukai, Hamamatsu (JP); Motoya Yamamoto, Hamamatsu (JP)

(73) Assignee: Asmo Co., Ltd., Shizuoka-Pref. (JP)

(*) Notice: Subject to any disclaimer, the term of this patent is extended or adjusted under 35 U.S.C. 154(b) by 501 days.

(21) Appl. No.: 10/325,979

(22) Filed: Dec. 23, 2002

(65) Prior Publication Data
US 2003/0122516 A1    Jul. 3, 2003

(30) Foreign Application Priority Data
Dec. 27, 2001  (JP) ............................. 2001-397357

(51) Int. Cl.$^7$ ............................................. E05F 15/10
(52) U.S. Cl. ................... 318/286; 318/459; 318/479; 318/504; 388/903
(58) Field of Search ................. 318/264–267, 318/286, 459, 466–470, 479, 504; 388/903, 388/904, 907.5

(56) References Cited

U.S. PATENT DOCUMENTS

| | | | | |
|---|---|---|---|---|
| 3,644,811 A | * | 2/1972 | Robbins | 318/266 |
| 5,128,597 A | * | 7/1992 | Kokubu | 318/286 |
| 6,078,154 A | * | 6/2000 | Manlove et al. | 318/293 |
| 6,630,808 B1 | * | 10/2003 | Kliffken et al. | 318/466 |

FOREIGN PATENT DOCUMENTS

JP    A-2002-103979    4/2002

* cited by examiner

*Primary Examiner*—Bentsu Ro
(74) *Attorney, Agent, or Firm*—Posz Law Group, PLC (57) ABSTRACT

A control unit stores a count value, which is used to detect an operational position of a roof glass, in a RAM. The control unit determines whether the count value is properly stored in the RAM when a voltage of a power supply falls below a predetermined voltage and thereafter returns to the predetermined voltage. Even in a case where the control unit determines that the count value is properly stored in the RAM, the control unit determines there is a possibility of having a deviation between an actual operational position of the roof glass and the count value. Thereafter, the control unit resets a reference point of the roof glass.

22 Claims, 7 Drawing Sheets

CLOSURE MEMBER CONTROL DEVICE AND METHOD FOR LIMITING POSITIONAL DEVIATION OF CLOSURE MEMBER

CROSS REFERENCE TO RELATED APPLICATION

This application is based on and incorporates herein by reference Japanese Patent Application No. 2001-397357 filed on Dec. 27, 2001.

BACKGROUND OF THE INVENTION

1. Field of the Invention

The present invention relates to a closure member control device for controlling opening and closing movements of a closure member, such as a roof glass or a door window glass of a vehicle. The present invention further relates to a method for limiting a deviation between an actual operational position of the closure member and a measured value that indicates the operational position of the closure member.

2. Description of Related Art

Various sunroof systems for vehicles have been proposed. In such a sunroof system, a rotational period of a drive motor, which drives a roof glass to open and close a roof glass, is measured to determine an operational position of the roof glass. The sunroof system includes a rotation sensor that outputs, for example, pulse signals corresponding to rotation of the drive motor. A control device, which controls the sunroof system, counts a number of leading edges or trailing edges of the pulse signals outputted from the rotation sensor and determines the operational position of the roof glass based on the count value. Then, the control device performs control operation of the roof glass based on the measured operational position of the roof glass.

The count value, which is used to determine the operational position of the roof glass, is stored in a random access memory (RAM) provided in the control device. The count value stored in the RAM is renewed each time the count value changes.

As is well known, the RAM is a volatile memory, in which the contents (data) are lost when power is removed. Thus, when a voltage of a power supply, which is applied to the control device, falls below a predetermined voltage and thereafter returns to the predetermined voltage, the data (count value) stored in the RAM could be lost. Thus, the control device determines whether the data (count value) stored in the RAM is properly stored.

For descriptive purpose, it is assumed that the roof glass is moved while an engine of the vehicle is not started. Then, while the roof glass is still moving, an engine starter motor is rotated to start the engine. At this time, the voltage of the power supply can be momentarily dropped below the predetermined voltage. In such a case, since the drop of the voltage of the power supply is the momentary drop, the data stored in the RAM may not be lost. Thus, when the RAM is checked, it may be determined that the data (count value) is properly stored in the RAM.

However, when the voltage of the power supply drops, it could happen that the pulse signal of the sensor shows an abnormal waveform. In such a case, the pulse signal cannot be properly counted. Furthermore, even when the pulse signal shows a normal waveform during the drop of the voltage of the power supply, it could happen that the pulse signal cannot be properly counted, or the writing or storing operation of the count value to the RAM cannot be performed. In such a case, even when the roof glass is moving, the count value stored in the RAM does not change. Thus, the count value shows a deviation from the actual operational position of the roof glass, resulting in a trouble in the control operation.

SUMMARY OF THE INVENTION

The present invention addresses the above disadvantages. Thus, it is an objective of the present invention to provide a closure member control device, which controls movement of a closure member based on a count value incremented and decremented based on rotation of a drive motor for driving the closure member and is capable of limiting a substantial deviation between an actual operational position of the closure member and the count value used to determine the operational position of the closure member even when a voltage of a power supply shows a substantial fluctuation. It is another objective of the present invention to provide a method for limiting a substantial deviation between the actual operational position of the closure member and the count value in the closure member control device.

To achieve the objectives of the present invention, there is provided a closure member control device connected to an external power supply. The closure member control device includes a closure member, a drive motor, a position detecting means, a storage device, a position information judging means, a motor operational state determining means and a positional deviation determining means. The closure member is movable between a first mechanical limit position at a closing travel end of the closure member and a second mechanical limit position at an opening travel end of the closure member. The drive motor drives the closure member to move the closure member between the first mechanical limit position and the second mechanical limit position. The position detecting means is for incrementing and decrementing a count value based on rotation of the drive motor and also for detecting an operational position of the closure member between the first mechanical limit position and the second mechanical limit position based on the count value. The storage device stores position information of the closure member, which indicates the operational position of the closure member obtained by the position detecting means. The position information judging means is for determining whether the position information stored in the storage device is erroneous when a voltage of the power supply falls below a predetermined voltage and thereafter returns to the predetermined voltage. The motor operational state determining means is for determining whether the drive motor is turned on at a point in time just before the voltage of the power supply falls below the predetermined voltage. The positional deviation determining means is for determining whether a deviation of the detected operational position of the closure member exists. The positional deviation determining means determines that the deviation of the detected operational position of the closure member exists upon satisfaction of a first set of the following conditions. That is, the position information judging means determines that the position information stored in the storage device is non-erroneous, and the motor operational state determining means determines that the drive motor is turned on at the point in time just before the voltage of the power supply falls below the predetermined voltage.

To achieve the objectives of the present invention, there is also provided a method for limiting a deviation of a detected operational position of a closure member, which is movable between a first mechanical limit position at a closing travel end of the closure member and a second mechanical limit position at an opening travel end of the closure member. In the method, an operational position of the closure member between the first mechanical limit position and the second mechanical limit position is detected based on a count value, which is incremented and decremented based on rotation of a drive motor that is powered by a power supply and drives the closure member to move the closure member between the first mechanical limit position and the second mechanical limit position. Position information of the closure member is then stored in a storage device. The position information indicates the operational position of the closure member obtained through the detecting of the operational position of the closure member. Next, it is determined whether the position information stored in the storage device is erroneous when a voltage of the power supply falls below a predetermined voltage and thereafter returns to the predetermined voltage. Then, it is determined whether the drive motor is turned on at a point in time just before the voltage of the power supply falls below the predetermined voltage. Thereafter, it is determined whether a deviation of the detected operational position of the closure member exists. The deviation of the detected operational position of the closure member is determined to exist upon satisfaction of a first set of the following conditions. That is, the position information stored in the storage device is determined to be non-erroneous in the determining of whether the position information stored in the storage device is erroneous, and the drive motor is determined to be turned on in the determining of whether the drive motor is turned on at the point in time just before the voltage of the power supply falls below the predetermined voltage.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

Figure 1:
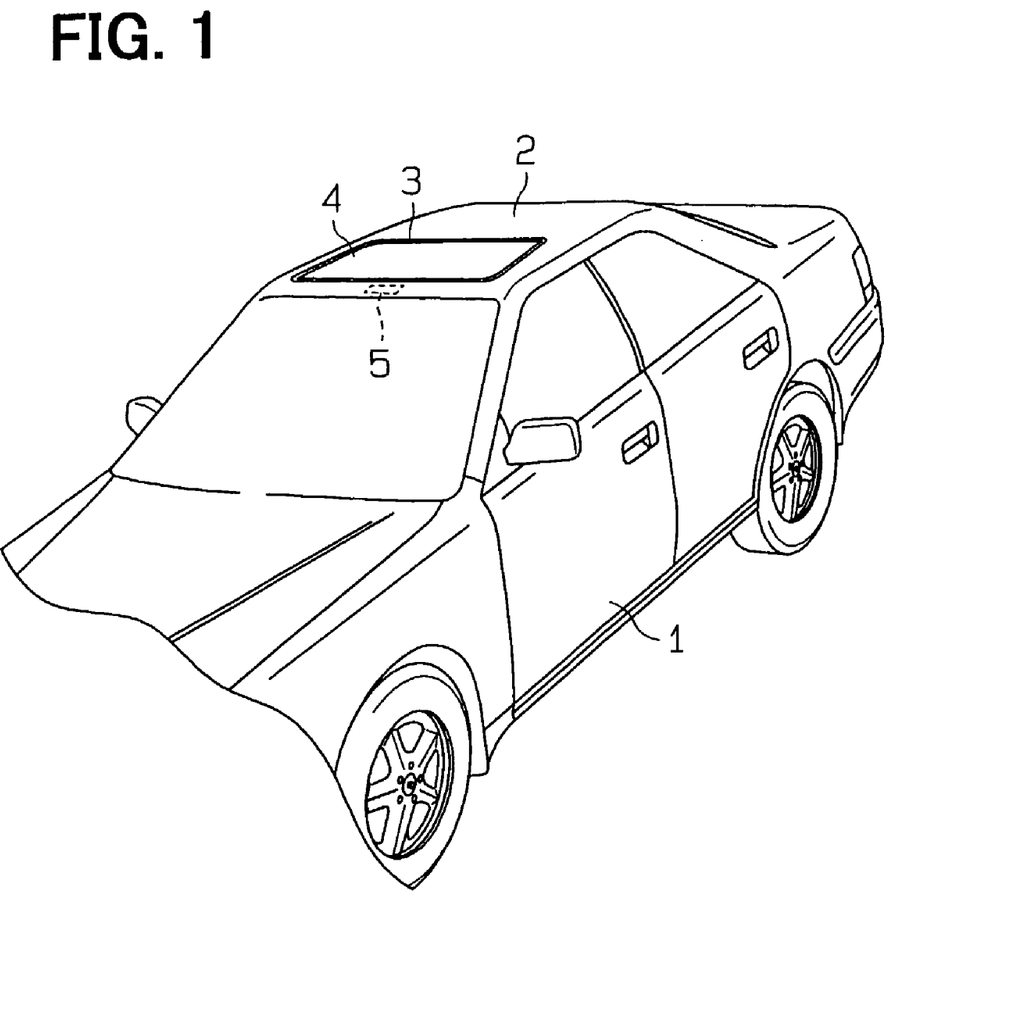
FIG. 1 is a partial schematic view of a vehicle having a sunroof system according to a first embodiment of the present invention.
Figure 2:
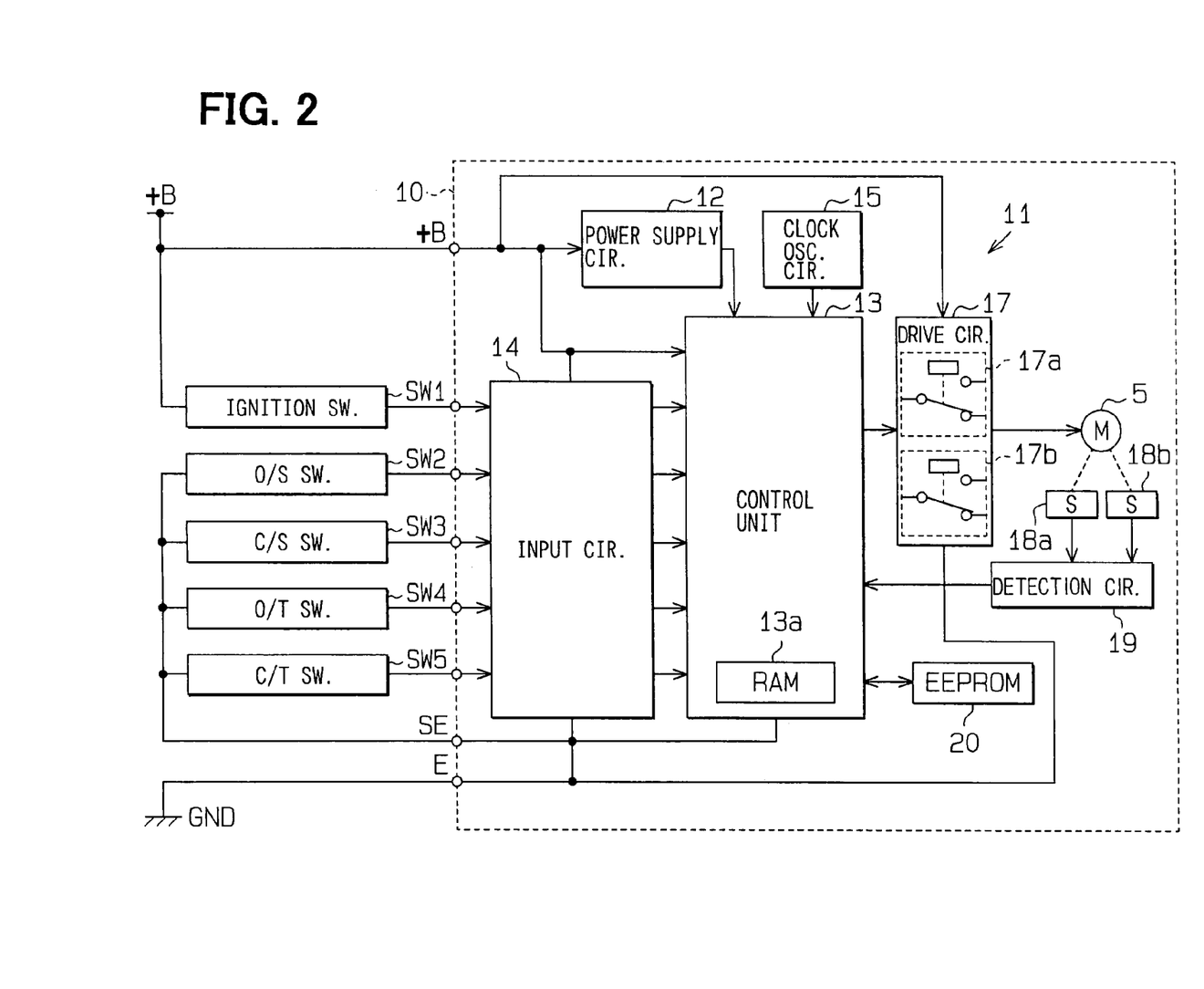
FIG. 2 is an electrical diagram representing an electrical arrangement of the sunroof system according to the first embodiment.

A first embodiment of the present invention will be described with reference to the accompanying drawings. With reference to FIGS. 1 and 2, a roof glass (closure member) 4 of a sunroof system (serving as a closure member control device) is arranged at a roof opening 3 formed in a roof panel 2 of a vehicle 1. The roof glass 4 can reciprocably slide (i.e., can perform opening and closing slide movements) in a fore-aft direction of the vehicle. The roof glass 4 can also move or pivot in the vertical direction about its front end lateral axis that extends in a lateral direction of the vehicle (i.e., can perform opening and closing tilt movements). The roof glass 4 is opened and closed by a drive motor 5, which is indicated by a dotted line in FIG. 1, through a drive force transmission mechanism (not shown). The drive motor 5 and a control device (described below) 11, which controls operation of the drive motor 5, constitute a drive unit 10. The drive unit 10 is arranged between a front portion of the roof panel 2, which is located in front of the roof opening 3, and a passenger room side molded roof panel (not shown).

Figure 3:
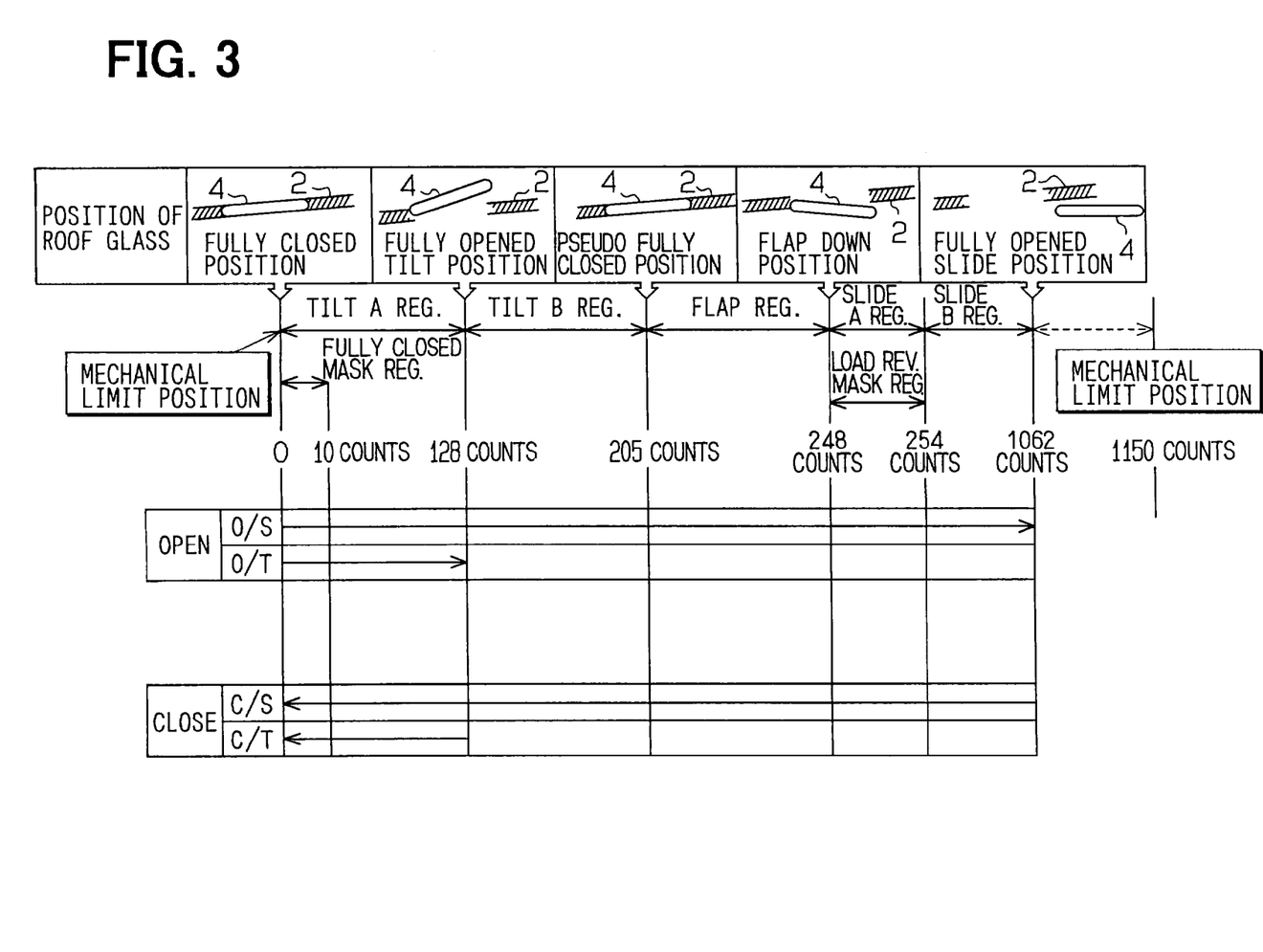
FIG. 3 is a schematic view for describing opening and closing movements of a roof glass of the sunroof system of the first embodiment.

As shown in FIG. 3, the roof glass 4 of the present embodiment can be placed in one of a fully closed position, a fully opened tilt position (i.e., a position where a rear end of the roof glass 4 is displaced from the fully closed position to a highest vertical point located outside a passenger room of the vehicle), a pseudo fully closed position, a flap down position (i.e., a position where the rear end of the roof glass 4 is displaced from the pseudo fully closed position to the lowest vertical point located inside the passenger room) and a fully opened slide position. Furthermore, in the present embodiment, opening movement of the roof glass 4 from the fully closed position to the fully opened slide position via the fully opened tilt position, the pseudo fully closed position and the flap down position will be referred to as opening slide movement (indicated as O/S in FIG. 3). Movement opposite to this opening slide movement will be referred to as closing slide movement (indicated as C/S in FIG. 3). The opening and closing slide movements are performed upon operation of opening and closing slide operation switches SW2, SW3, respectively, described later. Furthermore, opening movement of the roof glass 4 from the fully closed position to the fully opened tilt position will be referred to as opening tilt movement (indicated as O/T in FIG. 3). Movement opposite to the opening tilt movement will be referred to as closing tilt movement (indicated as C/T in FIG. 3). The opening and closing tilt movements of the roof glass 4 are performed upon operation of opening and closing tilt operation switches SW4, SW5, respectively, described later.

With reference to FIG. 2, the control device 11, which controls the operation of the drive motor 5, is connected to a battery (not shown). A voltage of a power supply +B (12 volts in the present embodiment) is applied from the battery to the control device 11. The voltage of the power supply +B is adjusted to a predetermined voltage through a power supply circuit 12 in the control device 11 and is then supplied to a control unit 13.

An ignition switch SW1 is connected to the control device 11. The ignition switch SW1 is connected to the control unit 13 through an input circuit 14 in the control device 11. The ignition switch SW1 outputs a control signal (ON signal) to the control unit 13 through the input circuit 14 upon corresponding operation of the ignition switch SW1. The control unit 13 operates based on the voltage of the power supply +B, which is applied to the control unit 13 through the power supply circuit 12 based on the ON signal of the ignition switch SW1.

Furthermore, various other switches SW2–SW5 for controlling opening and closing of the roof glass 4, i.e., an opening slide operation switch (O/S SW.) SW2, a closing slide operation switch (C/S SW.) SW3, an opening tilt operation switch (O/T SW.) SW4 and a closing tilt operation switch (C/T SW.) SW5 are also connected to the control device 11. The switches SW2–SW5 are connected to the control unit 13 through the input circuit 14 in the control device 11. When each of the switches SW2–SW5 is operated, it outputs a command signal (in the present embodiment, this signal is an ON signal of an L level (ground level)) to the control unit 13 through the input circuit 14.

A base clock signal, which is required for the operation of the control unit 13, is inputted to the control unit 13 from a clock oscillator circuit 15.

Furthermore, the control unit 13 applies the voltage of the power supply +B to the drive motor 5 through the drive circuit 17 to control the operation of the drive motor 5. The drive circuit 17 includes first and second relays 17a, 17b. Each relay 17a, 17b connects or disconnects the power supply +B to the drive motor 5 to rotate the drive motor 5 in a normal direction or reverse direction or to stop the drive motor 5.

That is, when the opening slide operation switch SW2 is once operated, i.e., when an ON signal is once inputted from the opening slide operation switch SW2 to the control unit 13, the control unit 13 drives the drive motor 5 by turning on the first relay 17a to connect the power supply +B to the drive motor 5 to drive the same to perform the opening movement (automatic opening movement) of the roof glass 4. Thus, the roof glass 4 is moved from the fully closed position to the fully opened slide position through the fully opened tilt position, the pseudo fully closed position and the flap down position. Then, when the control unit 13 detects that the roof glass 4 is positioned in the fully opened slide position through determination of a current operational position of the roof glass 4 described below, the control unit 13 turns off the first relay 17a to disconnect the power supply +B from the drive motor 5, so that the movement of the roof glass 4 is stopped.

On the other hand, when the closing slide operation switch SW3 is once operated, i.e., when an ON signal is once inputted from the closing slide operation switch SW3 to the control unit 13, the control unit 13 drives the drive motor 5 by turning on the second relay 17b to connect the power supply +B to the drive motor 5 to drive the same to perform the closing movement (automatic closing movement) of the roof glass 4. Thus, the roof glass 4 is moved from the fully opened slide position to the fully closed position through the flap down position, the pseudo fully closed position and the fully opened tilt position. Then, when the control unit 13 detects that the roof glass 4 is positioned in the fully closed position through the determination of a current operational position of the roof glass 4 described below, the control unit 13 turns off the second relay 17b to disconnect the power supply +B from the drive motor 5, so that the movement of the roof glass 4 is stopped.

Furthermore, when a corresponding one of the opening slide operation switch SW2 and the closing slide operation switch SW3 is operated during the automatic movement of the roof glass 4, the control unit 13 disconnects the power supply +B from the drive motor 5 to stop the movement of the roof glass 4. Thereafter, when the corresponding one of the opening slide operation switch SW2 and the closing slide operation switch SW3 is operated once again, the control unit 13 connects the power supply +B to the drive motor 5 to move the roof glass 4 from the stopped position to the fully opened slide position or the fully closed position.

While the opening tilt operation switch SW4 is operated, i.e., while an ON signal is inputted from the opening tilt operation switch SW4 to the control unit 13, the control unit 13 turns on the first relay 17a to connect the power supply +B to the drive motor 5 to drive the drive motor 5 to perform normal opening movement (manual opening movement) of the roof glass 4. When the operation of the opening tilt operation switch SW4 is stopped, i.e., when an OFF signal is inputted from the opening tilt operation switch SW4 to the control unit 13, the control unit 13 turns off the first relay 17a to disconnect the power supply +B from the drive motor 5 to stop the movement of the roof glass 4. Furthermore, in this case, when the control unit 13 detects that the roof glass 4 is positioned in the fully opened tilt position through the determination of a current operational position of the roof glass 4 described below, the control unit 13 disconnects the power supply +B from the drive motor 5 to stop the movement of the roof glass 4 even when the opening tilt operation switch SW4 is still operated, i.e., is turned on.

On the other hand, while the closing tilt operation switch SW5 is operated, i.e., while an ON signal is inputted from the closing tilt operation switch SW5 to the control unit 13, the control unit 13 turns on the second relay 17b to connect the power supply +B to the drive motor 5 to drive the drive motor 5 to perform normal closing movement (manual closing movement) of the roof glass 4. When the operation of the closing tilt operation switch SW5 is stopped, i.e., when an OFF signal is inputted from the closing tilt operation switch SW5 to the control unit 13, the control unit 13 turns off the second relay 17b to disconnect the power supply +B from the drive motor 5 to stop the movement of the roof glass 4. Furthermore, in this case, when the control unit 13 detects that the roof glass 4 is positioned in the fully closed position through the determination of a current operational position of the roof glass 4 described below, the control unit 13 disconnects the power supply +B from the drive motor 5 to stop the movement of the roof glass 4 even when the closing tilt operation switch SW5 is still operated.

The control device 11 also includes two Hall element magnetic sensors 18a, 18b on a circuit board that constitutes a part of the control device 11. The Hall element magnetic sensors 18a, 18b detect a rotational period (rotational speed) and a rotational direction of the drive motor 5. More specifically, a sensor magnet, which has a plurality of magnetic south poles and a plurality of magnetic north poles arranged alternately in a rotational direction of a rotatable shaft (not shown) of the drive motor 5, is provided around the rotatable shaft of the drive motor 5 to rotate integrally with the rotatable shaft. The Hall element magnetic sensors 18a, 18b are positioned adjacent to the sensor magnet and are arranged at a predetermined intervals in the rotational direction. That is, the rotation sensors used in the present embodiment are non-contacting rotation sensors that use magnetic effect. Each Hall element magnetic sensor 18a, 18b outputs pulsed output signals to a detection circuit 19 based on rotation of the drive motor 5 when the drive motor 5 rotates. The output signals (pulse signals) outputted from each Hall element magnetic sensor 18a, 18b are phase shifted from each other by a predetermined phase difference (e.g., ¼ period). The detection circuit 19 outputs each output signal (pulse signal) to the control unit 13, for example, after waveform shaping of the output signal.

The control unit 13 determines a rotational period (rotational speed) of the drive motor 5 based on a period of the output signals (pulse signal) inputted from each Hall element magnetic sensor 18a, 18b to the control unit 13 through the detection circuit 19.

That is, when one of the opening slide operation switch SW2 and the opening tilt operation switch SW4 is operated to input a corresponding ON signal to the control unit 13, the control unit 13 adds 1 to a current count value each time a leading edge or trailing edge of the output signal (pulse signal) outputted, for example, from the sensor 18b (see FIG. 3) is detected. On the other hand, when one of the closing slide operation switch SW3 and the closing tilt operation switch SW5 is operated to input a corresponding ON signal to the control unit 13, the control unit 13 subtracts 1 from the current count value each time a leading edge or trailing edge of the output signal (pulse signal) outputted, for example, from the sensor 18b is detected. Then, the control unit 13 determines the current operational position of the roof glass 4 based on the count value. The control unit 13, the Hall element magnetic sensors 18a, 18b and the detection circuit 19 serve as a position detecting means for incrementing and decrementing the count value based on rotation of the drive motor 5 and for detecting an operational position of the roof glass 4 between the first mechanical limit position (mechanical limit position located at the left end in FIG. 3) and the second mechanical limit position (mechanical limit position located at the right end in FIG. 3) based on the count value.

As shown in FIG. 3, by way of example, in the present embodiment, when the count value is equal to or less than 10, the roof glass 4 is determined to be in a fully closed mask region that indicates that the roof glass 4 is in the fully closed position. When the roof glass 4 is in the fully opened tilt position, the count value is 128. When the roof glass 4 is in the pseudo fully closed position, the count value is 205. In this case, a region between the count values 0 and 128 is referred to as a tilt A region, and a region between the count values 128 and 205 is referred to as a tilt B region. Furthermore, when the roof glass 4 is in the flap down position, the count value is 248. When the roof glass 4 is in the fully opened slide position, the count value is 1062. A region (slide A region in FIG. 3) between the count values 248 and 254 is a load reversed mask region where a pinching determination operation (described below), which determines whether an object is pinched by the roof glass 4, is not performed. That is, the pinching determination operation is carried out in the rest of the slide region (slide B region in FIG. 3) between the count values 254 and 1062. When the roof glass 4 is placed in the mechanical limit position (depicted at the right end in FIG. 3) at the opening travel end of the roof glass 4, the count value is 1150. Setting of a reference point or starting point (initial setting), which is used to determine relationship between the position of the roof glass 4 and the count value, is performed, for example, before shipment of a vehicle from a factory or at occurrence of abnormality, which does not allow normal operation of the sunroof system, during use of the vehicle. During the setting of the reference point (initial setting), the roof glass 4 is first placed in the mechanical limit position (depicted at the left end in FIG. 3) at the closing travel end of the roof glass 4, and then the count value is set to 0 (zero), for example, by operating the closing tilt operation switch SW5 for a predetermined time period or a predetermined number of times. At this time, a setting completion flag, which indicates completion of setting of the reference point, is set in the control unit 13.

The control unit 13 determines a rotational direction of the drive motor 5 based on a phase difference of each output signal (pulse signal) and determines a moving direction of the roof glass 4 based on the determined rotational direction of the drive motor 5.

When a rotational speed of the drive motor 5 drops below a predetermined pinching indication value during the automatic closing movement of the roof glass 4, the control unit 13 determines that an object is pinched between the roof glass 4 and the roof panel 2, thereby causing the drop of the rotational speed (i.e., causing an increased rotational period) of the drive motor 5. Then, the control unit 13 reversely rotates the drive motor 5 to release the object pinched by the roof glass 4 that is in the closing movement, so that the roof glass 4 makes a predetermined amount (corresponding to a predetermined count value) of reverse movement (load reverse movement) in an opening direction. At this time, the control unit 13 changes the subtracting operation of the count value to the adding operation of the count value based on the reversed rotation of the drive motor 5.

The control unit 13 includes a random access memory (RAM) 13a, serving as a storage device. The control unit 13 stores the count value, which is used to determine a current operational position of the roof glass 4, in the RAM 13a. The count value stored in the RAM 13a is renewed each time the count value changes. In this case, the control unit 13 stores the count value in the RAM 13a as a regular value and a corresponding mirror value (these values serve as position information of the roof glass 4). The regular value is obtained by simply converting the decimal count value to a corresponding binary value without modifying it. The mirror value is obtained by inverting all bits of the regular value expressed in the binary notation (i.e., by changing a state of each bit of the regular value to the opposite state).

The RAM 13a is a volatile memory in which the contents (i.e., data) are lost when power is removed. Thus, when the voltage of the power supply +B supplied through the power supply circuit 12 falls below the predetermined voltage and thereafter returns to the predetermined voltage, the data (count value) of the RAM 13a could be lost. Thus, in that case, the control unit 13 determines whether the data (count value) stored in the RAM 13a is non-erroneous, i.e., is properly stored in the RAM 13a (hereinafter, this determination will be referred to as RAM check operation). During the RAM check operation, the control unit 13 performs binary addition of the regular value of the count value and the mirror value of the count value and determines whether the data stored in the RAM 13a is properly stored in the RAM 13a based on the result of the binary addition.

When every bit of the result of the binary addition of the regular value and the mirror value becomes 1, the control unit 13 determines that the data (count value) is properly stored in the RAM 13a (i.e., the result of the RAM check operation is satisfactory). That is, the binary mirror value is the data obtained by inverting each bit of the binary regular value, so that when the data is properly stored in the RAM 13a, the every bit of the result of the binary addition has to be 1. Contrary to this, when every bit of the result of the addition of the binary regular value and the binary mirror value is zero, the control unit 13 determines that the data (count value) stored in the RAM 13a is lost (i.e., the result of the RAM check operation is not satisfactory). That is, when the power is removed from the RAM 13a, every bit of each of the binary regular value and the binary mirror value becomes zero, so that every bit of the result of the addition of the binary regular value and the binary mirror value also becomes zero.

The control unit 13 also stores the regular value of the current count value and the mirror value of the current count value in an electrically erasable, programmable read-only memory (EEPROM) 20 after a predetermined time period (e.g., 1 second) has elapsed since setting of the reference point or stop of the drive motor 5 (i.e., since stop of movement of the roof glass 4). The EEPROM 20 is a non-volatile memory, in which data can be erased and replaced with new data by the application of an electric pulse, and the data is not lost even when power is removed.

Figure 4:
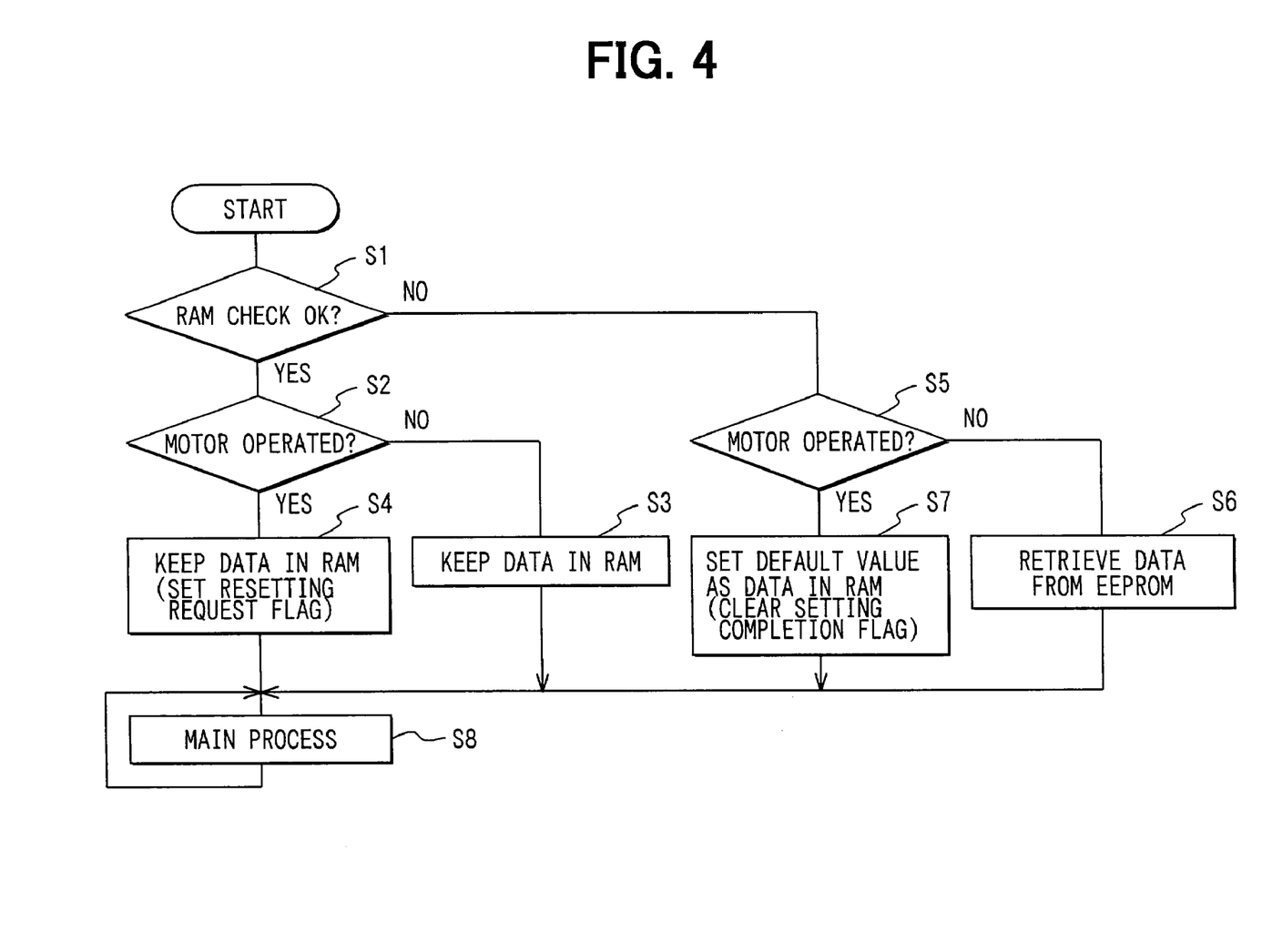
FIG. 4 is a flow chart showing RAM check operation according to the first embodiment.

The control unit 13 performs the RAM check operation by following a flowchart shown in FIG. 4. This operation starts when the voltage of the power supply +B applied to the control unit 13 through the power supply circuit 12 falls below the predetermined voltage and thereafter returns to the predetermined voltage.

At step S1, the control unit 13 determines whether the result of the RAM check operation is satisfactory. That is, when every bit of the result of the binary addition of the regular value of the count value and the mirror value of the count value stored in the RAM 13a is 1, the control unit 13 determines that the count value is non-erroneous, i.e., is properly stored in the RAM 13a (in other words, the result of the RAM check operation is satisfactory), so that the control unit 13 proceeds to step S2. Here, the control unit 13 at step S1 serves as a position information judging means for determining whether the position information stored in the RAM (storage device) 13a is erroneous when the voltage of the power supply +B falls below the predetermined voltage and thereafter returns to the predetermined voltage.

At step S2, the control unit 13 determines an operational state of the drive motor 5 at a point in time just before the voltage of the power supply +B falls below the predetermined voltage. In this case, the control unit 13 determines the operational state of the drive motor 5 based on motor state data (indicating ON or OFF of the drive motor 5), which is renewed at predetermined time intervals (e.g., every three seconds) during a main process at step S8 described below. When the control unit 13 determines that the drive motor 5 is not operated, i.e., when the motor state data is "OFF", the control unit 13 assumes that the roof glass 4 is not operated at the time of falling of the voltage of the power supply +B below the predetermined voltage. Thus, the control unit 13 determines that there is no substantial deviation between the actual operational position of the roof glass 4 and the corresponding count value stored in the RAM 13a. Then, the control unit 13 moves to step S3.

At step S3, the control unit 13 keeps the count value stored in the RAM 13a without modifying it and proceeds to step S8.

At step S8, the control unit 13 performs a main process. In the main process, the roof glass 4 is moved based on the operational position of the roof glass 4, which is determined according to the count value stored in the RAM 13a, and also based on the operation of the switches SW2–SW5. The control unit 13 repeats the main process of step S8 until the voltage of the power supply +B falls below the predetermined voltage. Furthermore, as described above, the control unit 13 determines whether the motor state is ON or OFF at the predetermined time intervals through a process shown in FIG. 5.

Figure 5:
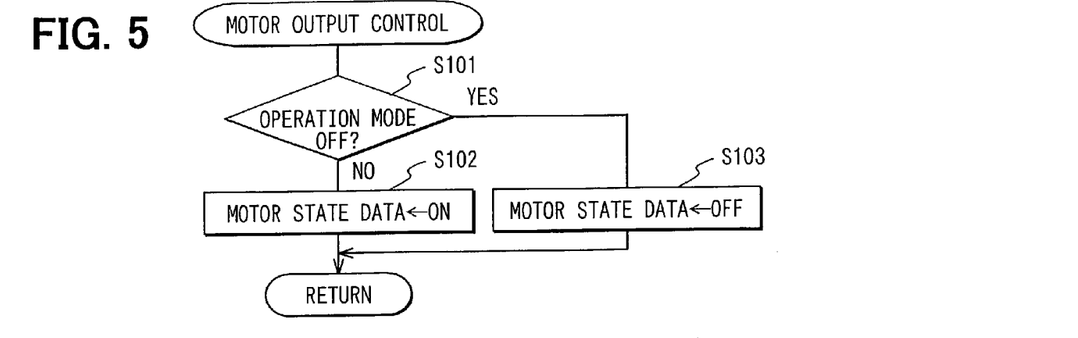
FIG. 5 is a flow chart showing a way of determining a state of a drive motor of the sunroof system according to the first embodiment.

With reference to FIG. 5, the control unit 13 first determines whether an operational mode of the drive motor 5 is off at step S101. This is determined based on an operational state (ON or OFF state) of each relay 17a, 17b. That is, when the relays 17a, 17b are both turned off, the control unit 13 determines that the operational mode of the motor 5 is off at step S101 and proceeds to step S103 where the motor state data is set as OFF and is stored in the RAM 13a. On the other hand, when, one of the relays 17a, 17b is turned on, the control unit determines that the operational mode of the motor 5 is on at step S101 and proceeds to step S102 where the motor state data is set as ON and is stored in the RAM 13a. The motor state data set at step S102 or S103 is also stored in the EEPROM 20 at time of starting the drive motor 5 and also at time of stopping the drive motor 5. The control unit 13 at steps S101–S103 in FIG. 5 serves as a motor operational state determining means for determining whether the drive motor 5 is turned on at the point in time just before the voltage of the power supply +B falls below the predetermined voltage.

Returning to step S2 in FIG. 4, when it is determined that the drive motor 5 is operated, i.e., when it is determined that one of the relays 17a, 17b is turned on at the point in time just before falling of the voltage of the power supply +B below the predetermined voltage, the control unit 13 proceeds to step S4. At step S4, the control unit 13 keeps the count value stored in the RAM 13a without modifying it and sets a resetting request flag, which requests resetting of the reference point, to reset the reference point.

That is, when the roof glass 4 is operated at the time of falling of the voltage of the power supply +B below the predetermined voltage, the output signal (pulse signal) of the sensors 18a, 18b could show an abnormal waveform. In such a case, the output signal (pulse signal) cannot be properly counted. Furthermore, even when the output pulse shows a normal waveform, it could happen that the output signal (pulse signal) cannot be properly counted or the writing operation of the count value to the RAM 13a cannot be performed. Thus, even in the case where the result of the RAM check operation is determined to be satisfactory, when the drive motor 5 is operated (i.e., when the roof glass 4 is moving) at the time of falling of the voltage of the power supply +B, a deviation between the actual operational position of the roof glass 4 and the count value could occur, so that the control unit 13 sets the resetting request flag.

Then, the control unit 13 moves to step S8 where the main process is performed. At this time, when the roof glass 4 is placed in the mechanical limit position at the closing travel end of the roof glass 4 in the main process at step S8, the control unit 13 resets the reference point by setting the count value to zero. More specifically, the control unit 13 resets the reference point by following a flow chart shown in FIG. 6.

Figure 6:
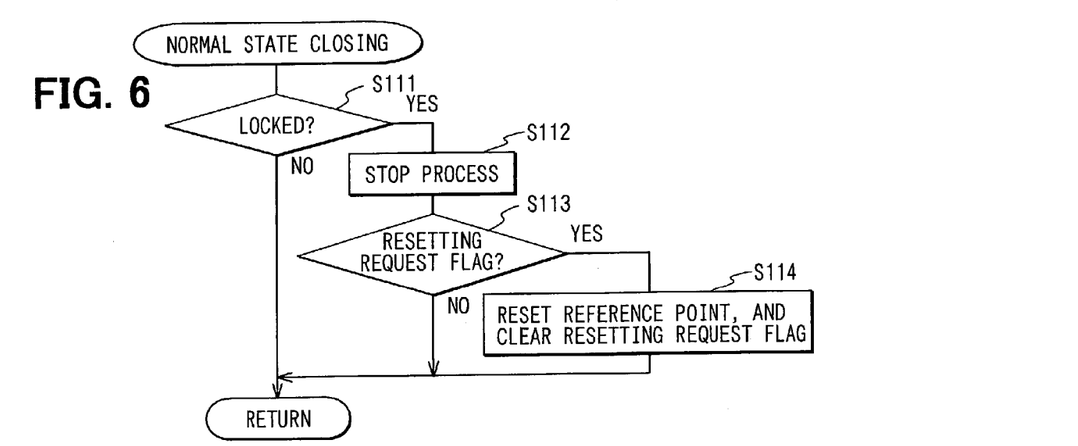
FIG. 6 is a flow cart showing a way of resetting a reference point according to the first embodiment.

When the roof glass 4 is placed in the mechanical limit position at the closing travel end of the roof glass 4 by the closing slide movement or the closing tilt movement, and the locked state of the drive motor 5 is detected at step S111, the control unit 13 performs stop process to stop the drive motor 5 at step S112. Then, the control unit determines whether the resetting request flag is set at step S113. When it is determined that the resetting request flag is set at step S113, the control unit 13 moves to step S114 where the control unit 13 sets the count value to zero (resetting the reference point). Also, at this time, the control unit 13 clears the resetting request flag. In this way, the reference point of the roof glass 4 is reset. The resetting of the reference point is unlike the setting of the reference point (initial setting), which is performed at the time of shipment of the vehicle or at the occurrence of the abnormality, which does not allow normal operation of the sunroof system, during use of the vehicle. That is, the resetting of the initial point allows easy setting of the reference point.

When every bit of the result of the binary addition of the regular value of the count value and the mirror value of the count value is zero, or when every bit of the result of the binary addition is not 1 at step S1, the control unit determines that the data stored in the RAM 13a is lost (i.e., the result of the RAM check operation is not satisfactory). That is, the control unit 13 assumes that the reference point (operational position) of the roof glass 4 is lost, and thus the roof glass 4 is under the abnormal operational state, so that the control unit 13 proceeds to step S5.

At step S5, similar to step S2, the control unit 13 determines an operational state of the drive motor 5 at the point in time just before the voltage of the power supply +B falls below the predetermined voltage. In this case, the control unit 13 determines the operational state of the drive motor 5 based on the motor state data (indicating ON or OFF of the drive motor 5) obtained through the above-described steps S101–S103. When the control unit 13 determines that the drive motor 5 is not operated, i.e., the relays 17a, 17b are both turned off, the control unit 13 proceeds to step S6. At step S6, the control unit 13 retrieves the data (count value) stored in the EEPROM 20 and stores the retrieved data (count value) in the RAM 13a.

That is, since the roof glass 4 is not operated at the time of falling of the voltage of the power supply +B below the predetermined voltage, the control unit 13 assumes that the data (count value) stored in the EEPROM 20 and the actual operational position of the roof glass 4 coincide with each other, so that the control unit 13 stores the data (count value) of the EEPROM 20 in the RAM 13a. Then, the control unit 13 assumes that the roof glass 4 can perform normal operation based on the data (count value) stored in the RAM 13a, so that the control unit 13 proceeds to step S8 where the control unit 13 performs the main process.

On the other hand, when the control unit 13 determines that the drive motor 5 is operated (i.e., one of the relays 17a 17b is turned on) at the point in time just before the voltage of the power supply +B falls below the predetermined voltage at step S5, control unit 13 proceeds to step S7. At step S7, the control unit 13 sets a default value (e.g., sets every bit to zero) in the RAM 13a, and the setting completion flag, which has been set at the time of setting the reference point (initial setting), for example, before shipment of the vehicle to indicate the completion of setting of the reference point, is cleared. In the present embodiment, the control unit 13 at steps S2 and S5 serves as a positional deviation determining means for determining whether a deviation (or substantial deviation) of the detected operational position of the roof glass (closure member) 4 exists.

When the result of the RAM check operation is not satisfactory, the control unit 13 has lost the reference point (operational position) of the roof glass 4, and thus the roof glass 4 is under the abnormal operational state, which does not allow the normal operation of the roof glass 4. Thus, the normal operation of the roof glass 4 cannot be performed through operation of the switches SW2–SW5. As a result, when the setting completion flag is cleared, the control unit 13 operates the roof glass 4 in an inching movement (reference point setting state movement) mode where the roof glass 4 is inching a predetermined distance that corresponds to a predetermined count value in an opening direction or closing direction when a corresponding one of the switches SW2–SW5 is operated in the main process at step S8. In this way, an operator can note that the reference point (initial setting) needs to be set. Then, the control unit 13 sets the reference point through operation of a flow chart shown in FIG. 7. The control unit 13 at step S7 serves as a reference point setting state indicating means for indicating a need for setting a reference point of the roof glass 4 when it is determined that that the deviation of the detected operational position of the roof glass 4 exists.

Figure 7:
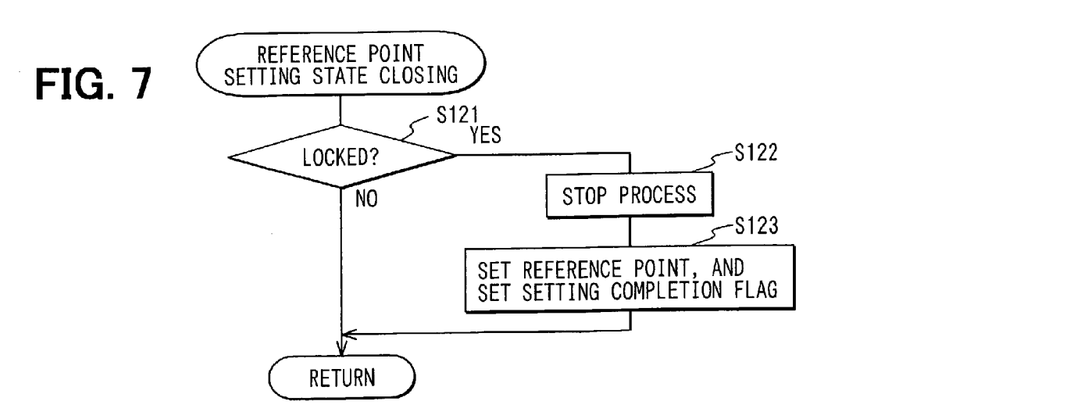
FIG. 7 is a flow chart showing a way of setting the reference point (initial setting) according to the first embodiment.

At step S121, when the closing slide movement or closing tilt movement of the roof glass 4 is performed in the inching movement (reference point setting state movement) mode to place the roof glass 4 in the mechanical limit position at the closing travel end of the roof glass 4, and the control unit 13 detects the locked state of the drive motor 5 upon placement of the roof glass 4 in the mechanical limit position at the closing travel end of the roof glass 4, the control unit 13 performs the stop process to stop the drive motor 5 at step S122. Then, at step S123, when the roof glass 4 is placed in the mechanical limit position at the closing travel end of the roof glass 4, and the closing tilt operation switch SW5 is operated for the predetermined time period or by the predetermined number of times, the control unit 13 sets the count value to zero. Then, the control unit 13 sets the setting completion flag, and the setting of the reference point (initial setting) is terminated.

In the present embodiment, even when there is a substantial change in the voltage of the power supply +B, which results in the falling of the voltage of the power supply +B below the predetermined voltage, a deviation between the actual operational position of the roof glass 4 and the count value, which is used to determine the operational position of the roof glass 4, can be reliably limited.

As described above, the sunroof system according to the present embodiment provides the following advantages.

(1) In the above embodiment, the count value is stored in the RAM 13a each time the count value, which is used to determine the operational position of the roof glass 4, changes. When the voltage of the drive power source +B falls below the predetermined voltage and thereafter returns to the predetermined voltage, it is determined whether the count value is properly stored in the RAM 13a. Even in the case where it is determined that the count value is properly stored in the RAM 13a, when the drive motor 5, which moves the roof glass 4 in the opening direction or closing direction, is operated at the point in time just before the voltage of the power supply +B falls below the predetermined voltage, the control unit 13 determines that there is the possibility of having a deviation between the actual operational position of the roof glass 4 and the count value. Then, after the determination, when the roof glass 4 is placed in the predetermined position (mechanical limit position at the closing travel end of the roof glass 4), the control unit 13 resets the reference point to set the count value to the predetermined count value (zero).

That is, when the voltage of the power supply +B falls below the predetermined voltage, it could happen that the count operation cannot be properly performed, or the count value cannot be stored in the RAM 13a. When the drive motor 5 is operated at that time, the count value stored in the RAM 13a does not change even though the roof glass 4 is moving. Therefore, the deviation between the actual operational position of the roof glass 4 and the count value could be generated. Since the resetting of the reference point of the roof glass 4 is performed upon consideration of the above case, the deviation between the actual operational position of the roof glass 4 and the count value can be limited.

(2) In the above embodiment, when it is determined that there is the possibility of having the deviation between the actual operational position of the roof glass 4 and the count value (or the measured operational position of the roof glass 4), and immediately thereafter the roof glass 4 is placed in the predetermined position (mechanical limit position at the closing travel end of the roof glass 4), the control unit 13 resets the count value to the predetermined count value (zero). That is, since the resetting of the count value is carried out immediately after it is determined that there is the possibility of having the deviation between the actual operational position of the roof glass 4 and the count value, the deviation can be limited at the early time point.

(3) In the above embodiment, the resetting of the reference point is carried out by setting the count value to the predetermined count value (zero) while the roof glass 4 is placed in the mechanical limit position at the closing travel end of the roof glass 4. Thus, the resetting of the reference point can be relatively easily carried out.

(4) In the above embodiment, the drive motor 5 receives the voltage of the power supply +B through one of the relays 17a, 17b, and the control unit 13 determines whether the drive motor 5 is operated based on the operational state (ON/OFF state) of the corresponding relay 17a, 17b. Thus, the operational state of the drive motor 5 can be relatively easily determined.

(5) In the above embodiment, the binary regular value of the count value and the binary mirror value of the count value, which is obtained by inverting all bits of the binary regular value, are stored in the RAM 13a. The control unit 13 determines whether the count value is properly stored in the RAM 13a based on the result of the binary addition of the regular value and the mirror value. Thus, when the control value is properly store in the RAM 13a, every bit of the result of the binary addition becomes 1, so that whether the count value is properly stored in the RAM 13a can be relatively easily determined.

(6) In the above embodiment, the EEPROM 20 is provided in the control device 11, and the count value stored in the RAM 13a is retrieved from the RAM 13a and is stored in the EEPROM 20 at the predetermined timing. Thus, even in the case where the result of the RAM check operation is not satisfactory, when the drive motor 5 is not operated, the count value stored in the EEPROM 20 is stored in the RAM 13a without modification, so that it is easy to return to the normal operable state.

The embodiment of the present invention can be modified as follows.

In the above embodiment, although the control unit 13 performs the operation based on the flow chart shown in FIG. 4, this flow chart can be modified in any appropriate manner. For example, in the flowchart shown in FIG. 4, although the RAM check operation is carried out before determination of the operational state of the motor 5, the operational state of the motor 5 can be determined first, and then the RAM check operation can be performed.

In the above embodiment, the control unit 13 carries out the RAM check operation through the binary addition of the regular value of the count value and the mirror value of the count value. However, the way of the checking the RAM is not limited to the above one and can be modified in any appropriate manner.

In the above embodiment, the RAM 13a stores both the regular value of the count value and the mirror value of the count value. However, the RAM 13a can store only one of the regular value and the mirror value. In such a case, the way of checking the RAM should be modified in any appropriate manner to achieve this. Furthermore, the RAM 13a can store any information other than the count value.

In the above embodiment, the control device 11 includes the EEPROM 20. However, if the EEPROM 20 is not particularly required, the EEPROM 20 can be eliminated.

In the above embodiment, the resetting of the reference point of the roof glass 4 is carried out immediately after it is determined that there is the possibility of having the deviation between the actual operational position of the roof glass 4 and the count value (step S4 in FIG. 4). However, the resetting of the reference point of the roof glass 4 is not necessarily carried out immediately after it is determined that there is the possibility of having the deviation between the actual operational position of the roof glass 4 and the count value. For example, the resetting of the reference point can be carried out after a predetermined number of opening and closing operations of the roof glass 4 is performed or after a predetermined number of the above determination is repeated.

In the above embodiment, the count value is set to the predetermined count value (zero) while the roof glass 4 is placed in the mechanical limit position at the closing travel end of the roof glass 4. However, the position of the roof glass 4 is not limited to this. For example, the count value can be set to the predetermined count value when the roof glass 4 is positioned in the mechanical limit position at the opening travel end of the roof glass 4. In such a case, the count value can be set to a value that corresponds to the mechanical limit position at the opening travel end of the roof glass 4.

In the above embodiment, the operational state of the drive motor 5 is determined based on the ON/OFF state of the corresponding relay 17a, 17b. However, the operational state of the drive motor 5 can be determined in any other appropriate manner.

In the above embodiment, when the rotational speed of the drive motor 5 is lower than the predetermined pinching indication value, the control unit 13 determines that the object is pinched by the roof glass 4. However, the way of determining the pinching of the object is not limited to this and can be modified in any appropriate manner.

In the above embodiment, the Hall element magnetic sensors 18a, 18b are used as the rotation sensors. Alternative to the Hall element magnetic sensors 18a, 18b, a magneto-resistive element (s) can be used. Furthermore, alternative to the non-contacting magnetic sensors, an optical rotation sensor(s) can be used. Further alternatively, a contacting rotation sensor having a sliding contact that slidably contacts a rotatable component of the motor can be used.

The circuit arrangement of the control device 11 is not limited to the above described one and can be modified in any appropriate manner.

In the above embodiment, the drive motor 5 and the control device 11, which includes the Hall element magnetic sensors 18a, 18b and the control unit 13, are integrated as the drive unit 10. However, the present invention is not limited to this arrangement, and thus this arrangement can be modified in any appropriate manner. For example, the control device 11 can be provided separately from the drive unit 10.

In the above embodiment, the invention is embodied in the sunroof system that performs the opening and closing slide movements and opening and closing tilt movements. Alternatively, the present invention can be embodied in any other sunroof systems, which perform the opening and closing slide movements and opening and closing tilt movements in any other appropriate manner. Further alternatively, the invention can be embodied in sunroof systems, which perform opening and closing slide movements or opening and closing tilt movements.

(Second Embodiment)

A second embodiment of the present invention will be described with reference to FIGS. 8 and 9. In the second embodiment, the invention is embodied in a power window system of a vehicle 31. Components similar to those of the first embodiment will be indicated by similar numerals and will not be discussed further for the sake of simplicity.

Figure 8:
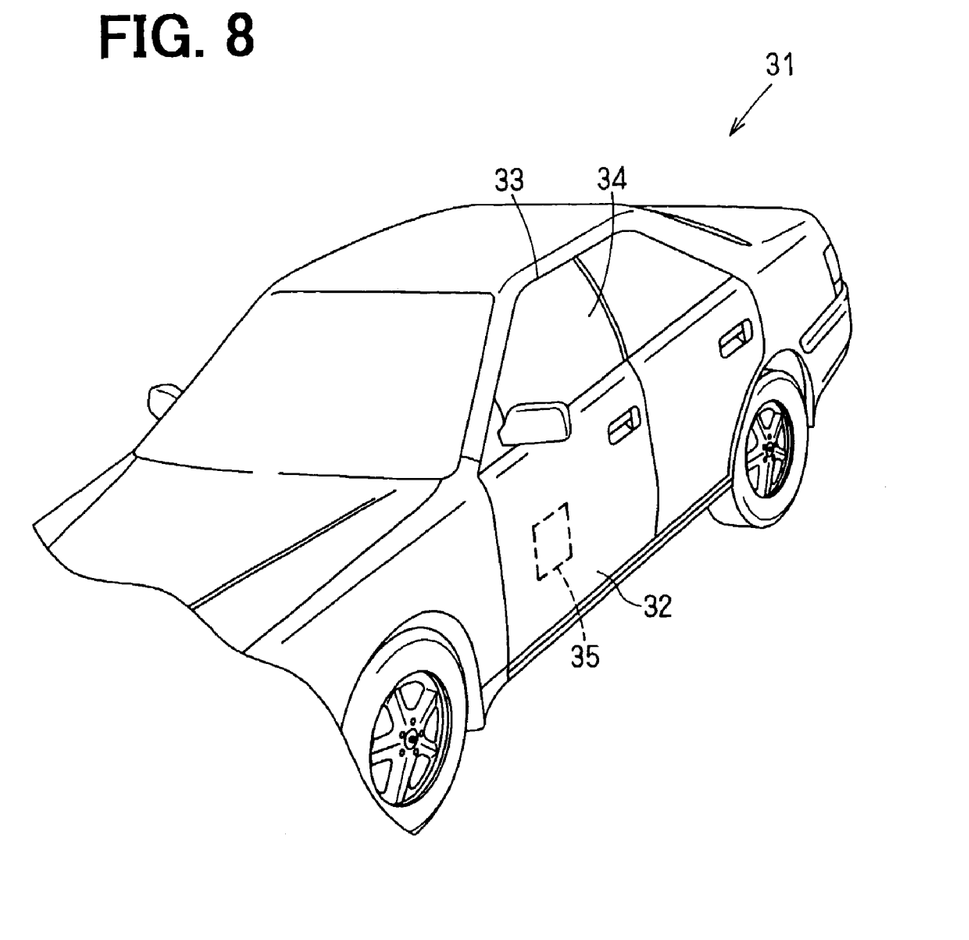
FIG. 8 is a partial schematic view of a vehicle having a power window system according to a second embodiment of the present invention.

FIG. 8 is a schematic perspective view of the vehicle 31. A door 32 is arranged at one side of a vehicle 31. A window opening 33 is formed in the door 32. The window opening 33 is opened and closed by a window glass (serving as a closure member of the present invention) 34 that is vertically reciprocably arranged in the door 32.

The reciprocating movement (opening and closing movements) of the window glass 34 is achieved by rotating a direct current drive motor 35 (indicated by a dotted line in FIG. 8), which is arranged in the door 32, in a normal direction and a reverse direction. In the present embodiment, when the motor 35 rotates in the normal direction, corresponding drive force of the motor 35 is transmitted to the window glass 34 through a transmission mechanism (not shown), so that the window glass 34 is moved toward a fully closed position (a first mechanical limit position of the present invention). On the other hand, when the motor 35 rotates in the reverse direction that is opposite to the normal direction, corresponding drive force of the motor 35 is transmitted to the window glass 34 through the transmission mechanism, so that the window glass 34 is moved toward a fully opened position (a second mechanical limit position of the present invention).

Figure 9:
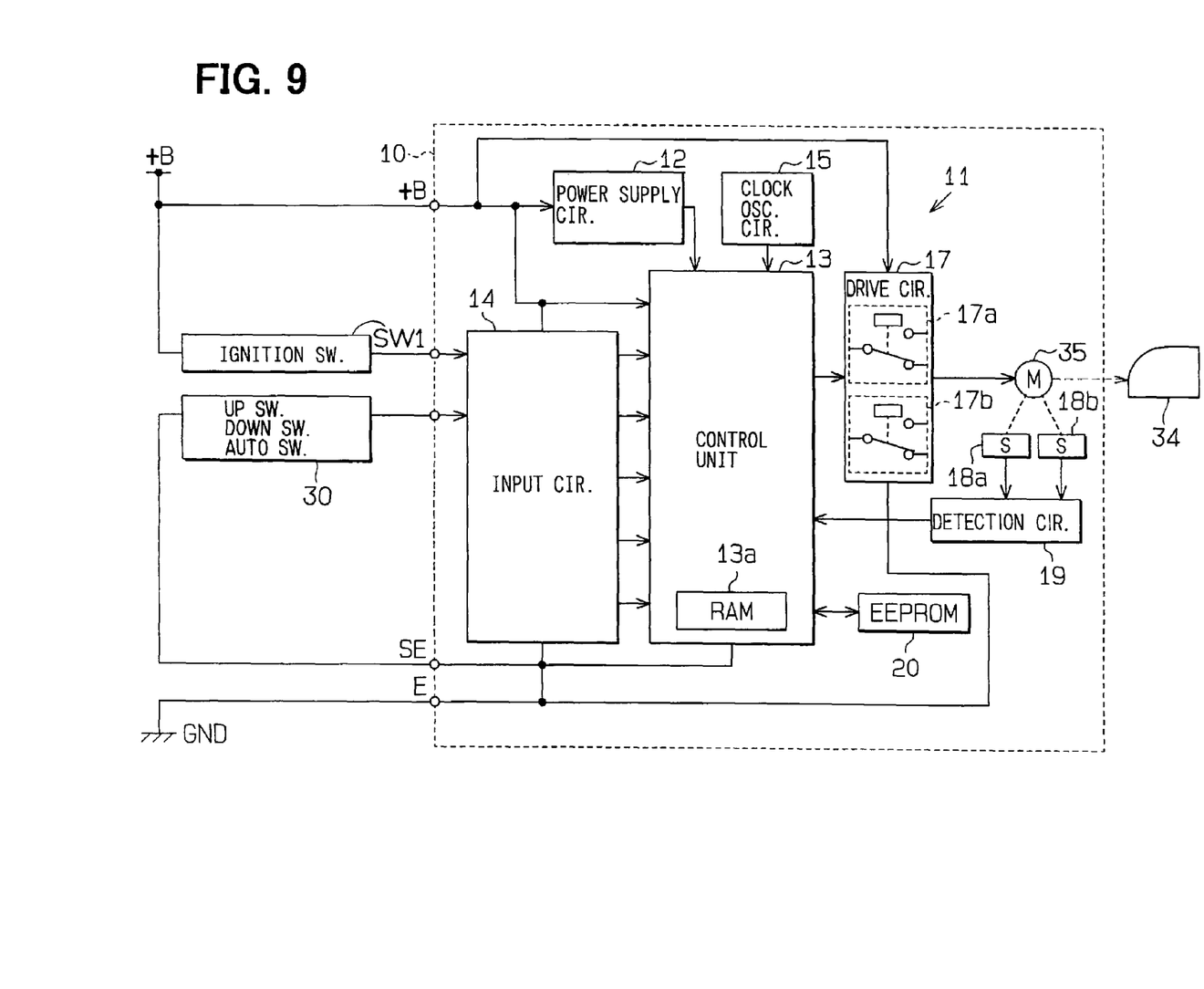
FIG. 9 is an electrical diagram representing an electrical arrangement of the power window system according to the second embodiment.

FIG. 9 shows a control device 11 for controlling operation of the motor 35. A switch unit 30 for operating the motor 35 to move the window glass 34 is connected to the control device 11. The switch unit 30 includes an up switch (UP SW), a down switch (DOWN SW) and an auto switch (AUTO SW). The switch unit 30 is connected to a control unit 13 through an input circuit 14 in the control device 11. While the up switch is turned on, the motor 5 is rotated in the normal direction to raise the window glass 34. On the other hand, while the down switch is turned on, the motor 5 is rotated in the reverse direction to lower the window glass 34. When the auto switch is turned on simultaneously with the up switch or the down switch, the window glass 34 is raised or lowered all the way to the fully closed position or the fully opened position. Operation of the switch unit 30 causes output of a corresponding command signal to the control unit 13 through the input circuit 14. The control operation of the power window system is similar to that of the sunroof system of the first embodiment and is thus not discussed in the greater detail.

In the first embodiment, the invention is embodied in the sunroof system, which uses the roof glass as the closure member. In the second embodiment, the invention is embodied in the power window system, which uses the window glass as the closure member. Alternatively, the present invention can be embodied in a slide door system, which uses a slide door as a closure member for closing an entrance, or in any other system or device. Furthermore, the present invention can be embodied in any systems or devices used in anything other than vehicles for opening and closing a corresponding closure member.

Additional advantages and modifications will readily occur to those skilled in the art. The invention in its broader terms is therefore, not limited to the specific details, representative apparatus, and illustrative examples shown and described.

What is claimed is:

1. A closure member control device connected to an external power supply, wherein the closure member control device comprising:
   a closure member that is movable between a first mechanical limit position at a closing travel end of the closure member and a second mechanical limit position at an opening travel end of the closure member;
   a drive motor that drives the closure member to move the closure member between the first mechanical limit position and the second mechanical limit position;
   a position detecting means for:
     incrementing and decrementing a count value based on rotation of the drive motor; and
     detecting an operational position of the closure member between the first mechanical limit position and the second mechanical limit position based on the count value;
   a storage device that stores position information of the closure member, which indicates the operational position of the closure member obtained by the position detecting means;
   a position information judging means for determining whether the position information stored in the storage device is erroneous when a voltage of the power supply falls below a predetermined voltage and thereafter returns to the predetermined voltage;
   a motor operational state determining means for determining whether the drive motor is turned on at a point in time just before the voltage of the power supply falls below the predetermined voltage; and
   a positional deviation determining means for determining whether a deviation of the detected operational position of the closure member exists, wherein the positional deviation determining means determines that the deviation of the detected operational position of the closure member exists upon satisfaction of a first set of the following conditions:
     the position information judging means determines that the position information stored in the storage device is non-erroneous; and
     the motor operational state determining means determines that the drive motor is turned on at the point in time just before the voltage of the power supply falls below the predetermined voltage.

2. A closure member control device according to claim 1, wherein when the positional deviation determining means determines that the deviation of the detected operational position of the closure member exists upon satisfaction of the first set of the conditions, the count value is set to a predetermined count value while the closure member is placed in a predetermined operational position.

3. A closure member control device according to claim 2, wherein the predetermined operational position of the closure member is the first mechanical limit position.

4. A closure member control device according to claim 1, further comprising at least one relay that is arranged between the external power supply and the drive motor such that electric power is supplied to the drive motor through at least one of the at least one relay, wherein the motor operational state determining means determines whether the drive motor is turned on by determining whether at least one of the at least one relay is turned on at the point in time just before the voltage of the power supply falls below the predetermined voltage.

5. A closure member control device according to claim 1, wherein the positional deviation determining means also determines that the deviation of the detected operational position of the closure member exists upon satisfaction of a second set of the following conditions:
   the position information judging means determines that the position information stored in the storage device is erroneous; and
   the motor operational state determining means determines that the drive motor is turned on at the point in time just before the voltage of the power supply falls below the predetermined voltage.

6. A closure member control device according to claim 5, further comprising a reference point setting state indicating means for indicating a need for setting a reference point of the closure member when the positional deviation determining means determines that the deviation of the detected operational position of the closure member exists upon satisfaction of the second set of the conditions.

7. A closure member control device according to claim 6, wherein the reference point setting state indicating means indicates the need for setting the reference point of the closure member by inching the closure member toward one of the first mechanical limit position and the second mechanical limit position.

8. A closure member control device according to claim 5, wherein when the positional deviation determining means determines that the deviation of the detected operational position of the closure member exists upon satisfaction of the second set of the conditions, the count value is set to a predetermined count value while the closure member is placed in a predetermined operational position.

9. A closure member control device according to claim 8, wherein the predetermined operational position of the closure member is the first mechanical limit position.

10. A closure member control device according to claim 5, further comprising at least one relay that is arranged between the external power supply and the drive motor such that electric power is supplied to the drive motor through at least one of the at least one relay, wherein the motor operational state determining means determines whether the drive motor is turned on by determining whether at least one of the at least one relay is turned on at the point in time just before the voltage of the power supply falls below the predetermined voltage.

11. A closure member control device according to claim 5, wherein the storage device is a volatile storage device.

12. A method for limiting a deviation of a detected operational position of a closure member, which is movable between a first mechanical limit position at a closing travel end of the closure member and a second mechanical limit position at an opening travel end of the closure member, the method comprising:
    detecting an operational position of the closure member between the first mechanical limit position and the second mechanical limit position based on a count value, which is incremented and decremented based on rotation of a drive motor that is powered by a power supply and drives the closure member to move the closure member between the first mechanical limit position and the second mechanical limit position;
    storing position information of the closure member in a storage device, wherein the position information indicates the operational position of the closure member obtained through the detecting of the operational position of the closure member;
    determining whether the position information stored in the storage device is erroneous when a voltage of the power supply falls below a predetermined voltage and thereafter returns to the predetermined voltage;
    determining whether the drive motor is turned on at a point in time just before the voltage of the power supply falls below the predetermined voltage; and
    determining whether a deviation of the detected operational position of the closure member exists, wherein the deviation of the detected operational position of the closure member is determined to exist upon satisfaction of a first set of the following conditions:
    the position information stored in the storage device is determined to be non-erroneous in the determining of whether the position information stored in the storage device is erroneous; and
    the drive motor is determined to be turned on in the determining of whether the drive motor is turned on at the point in time just before the voltage of the power supply falls below the predetermined voltage.

13. A method according to claim 12, further comprising setting the count value to a predetermined count value while the closure member is placed in a predetermined operational position upon satisfaction of the first set of the conditions in the determining of whether the deviation of the detected operational position of the closure member exists.

14. A method according to claim 13, wherein the predetermined operational position of the closure member is the first mechanical limit position.

15. A method according to claim 12, wherein the determining of whether the drive motor is turned on further includes determining whether at least one of at least one relay, which is arranged between the power supply and the drive motor, is turned on at the point in time just before the voltage of the power supply falls below the predetermined voltage.

16. A method according to claim 12, wherein the deviation of the detected operational position of the closure member is determined to exist in the determining of whether the deviation of the detected operational position of the closure member exists upon satisfaction of a second set of the following conditions:
    the position information stored in the storage device is determined to be erroneous in the determining of whether the position information stored in the storage device is erroneous; and
    the drive motor is determined to be turned off in the determining of whether the drive motor is turned on at the point in time just before the voltage of the power supply falls below the predetermined voltage.

17. A method according to claim 16, further comprising indicating a need for setting a reference point of the closure member when the deviation of the detected operational position of the closure member is determined to exist upon satisfaction of the second set of the conditions in the determining of whether the deviation of the detected operational position of the closure member exists.

18. A method according to claim 17, wherein the indicating of the need for setting the reference point of the closure member includes inching the closure member toward one of the first mechanical limit position and the second mechanical limit position.

19. A method according to claim 16, further comprising setting the count value to a predetermined count value while the closure member is placed in a predetermined operational position upon satisfaction of the second set of the conditions in the determining of whether the deviation of the detected operational position of the closure member exists.

20. A method according to claim 19, wherein the predetermined operational position of the closure member is the first mechanical limit position.

21. A method according to claim 16, wherein the determining of whether the drive motor is turned on includes determining whether at least one of at least one relay, which is arranged between the power supply and the drive motor, is turned on at the point in time just before the voltage of the power supply falls below the predetermined voltage.

22. A method according to claim 16, wherein the storage device is a volatile storage device.

* * * * *